July 12, 1949.    C. F. BACHLE    2,476,020
STRIP-TYPE THERMOCOUPLE
Filed May 20, 1946
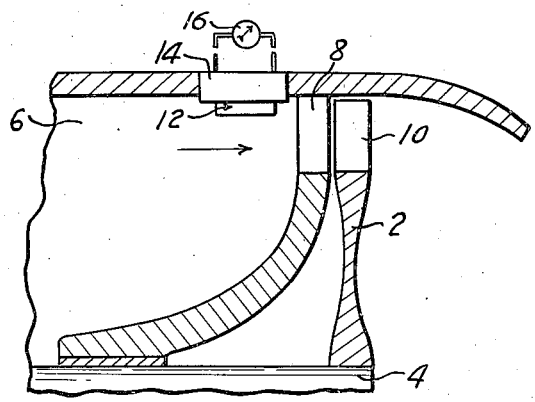
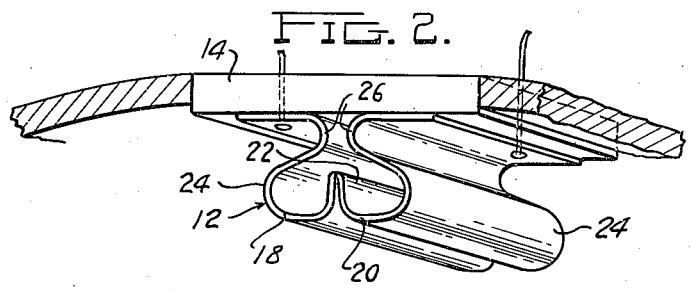
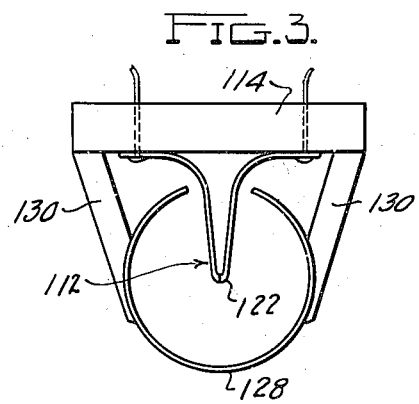
INVENTOR.
Carl F. Bachle
BY
Hauke & Hardesty
ATTORNEYS Patented July 12, 1949

2,476,020

UNITED STATES PATENT OFFICE 2,476,020

STRIP-TYPE THERMOCOUPLE

Carl F. Bachle, Detroit, Mich., assignor to Continental Aviation & Engineering Corporation, Detroit, Mich., a corporation of Virginia Application May 20, 1946, Serial No. 670,901

6 Claims. (Cl. 136—4)

This invention relates to a thermocouple.

For efficient gas turbine operation, close control of the temperature of the gas entering the turbine nozzle is essential. Most effective control requires measuring the temperature of the gas just before it enters the turbine nozzle. Heretofore, however, it has not been practicable to measure temperature at this point in the gas flow, because the blast of gas passing a conventional thermocouple placed at this point would always blow away the thermocouple.

It is the object of this invention to provide a thermocouple which is sufficiently thin to be quickly responsive to temperature changes, but which is strong enough to withstand gas blasts of relatively high velocity. The object is accomplished by a thermocouple which is made in the general shape of a ribbon, being very thin and thermosensitive along one axis and structurally strong along another axis.

In the drawings:

Fig. 1 shows the invention installed in a turbine immediately upstream from the turbine nozzles.

Fig. 2 is an enlarged detail view in perspective of one embodiment of the invention.

Fig. 3 is an end elevation view of another embodiment of the invention.

In Fig. 1 a portion of a gas turbine is shown in longitudinal section. A turbine wheel 2 is rotatably mounted on shaft 4. Gas from combustion chamber 6 expands through nozzle 8 to impinge on blades 10 of rotor 2. A thermocouple 12 embodying the features of this invention is disposed immediately upstream of nozzles 8. Thermocouple 12 is mounted on a heat-resistant block 14 which is also a non-conductor of electricity. A galvanometer is schematically indicated at 16 as being the temperature indicator in the thermocouple 12.

As is best shown in Fig. 2, thermocouple 12 comprises two ribbon-like thin wide strips 18 and 20 of dissimilar metals firmly joined together along edge 22 to form a hot junction. The hot junction is substantially V-shaped (inverted in Fig. 2) and the sides of the V are doubled back on the vertex of the V which forms the hot junction. These doubled back sides 24 serve to shield the hot junction from disturbances in combustion chamber 6 which might affect the hot junction by radiation. The doubled back sides 24 will preferably be brought very close together as at 26 to prevent heat radiation from the hot junction to the casing, in this case, block 14.

In the embodiment shown in Fig. 3, thermocouple 112 is shielded against radiation from the combustion chamber by a substantially circular shield 128 which is supported from block 114 by a plurality of struts 130.

As can be seen from the drawings, the metal strip of the thermocouple is very thin and therefore thermally very sensitive along any axis lying in a plane which is substantially perpendicular to edge 22 (or 122 of Fig. 3). In the case of the embodiment shown in Fig. 3, this plane is any plane which is parallel to the plane of the drawing. However, along any axis perpendicular to that plane, or parallel to edge 22 or 122, the thermocouple has great structural strength. The thermocouple will be installed in a turbine so that the axis of great strength is parallel to the direction of gas flow, and preferably immediately upstream from the turbine nozzle, as shown in Fig. 1.

I claim:

1. A thermocouple comprising two thin wide strips of dissimilar metals joined together to form a hot junction, the strips being bent back upon themselves from the junction to form a shield for the junction.

2. A thermocouple comprising two thin wide strips of dissimilar metals joined together to form a substantially V-shaped hot junction, the strips being doubled back from the vertex of the V to shield the hot junction.

3. The invention of claim 2, in which the doubled-back strips are brought close together without touching in order further to shield the hot junction.

4. In a power plant having a high velocity fluid carrier of heat moving through it, a thermocouple comprising two thin wide strips of dissimilar metals joined together to form a hot junction, the strips being bent back upon themselves from the junction to form a shield for the junction.

5. In a power plant having a high velocity fluid carrier of heat moving through it in a given direction, a thermocouple in the path of the carrier comprising two thin wide strips of dissimilar metals joined together along a line to form a hot junction, the thermocouple being oriented in the path of the carrier so that said line is substantially parallel to said direction, said strips being bent back upon themselves from the junction to form a shield for the junction and terminating at the outer wall of said carrier.

6. In a power plant having a high velocity fluid carrier of heat moving through it in a given direction, a thermocouple in the path of the carrier comprising two thin wide strips of dissimilar metals joined together along a line to form a hot junction, the thermocouple being oriented in the path of the carrier so that the aforesaid line is substantially parallel to said direction, said strips being bent back upon themselves from the junction to form a shield for the junction.

CARL F. BACHLE.

REFERENCES CITED

The following references are of record in the file of this patent:

UNITED STATES PATENTS

| Number | Name | Date |
|---|---|---|
| 1,291,409 | Chubb et al. | Jan. 14, 1919 |
| 2,006,469 | Lucke | July 2, 1935 |
| 2,291,448 | Bragg | July 28, 1942 |
| 2,305,396 | Volochine | Dec. 15, 1942 |
| 2,372,506 | Mantz | Mar. 27, 1945 |